L. T. PETERSEN.
CONVEYER BELT.
APPLICATION FILED FEB. 9, 1921.
1,405,158.
Patented Jan. 31, 1922.
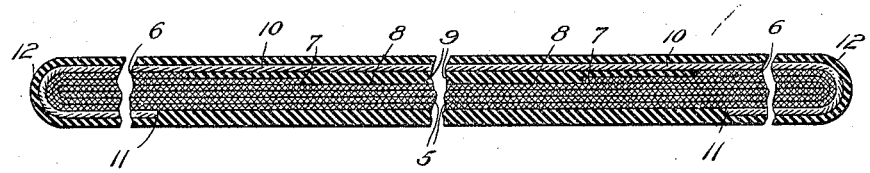
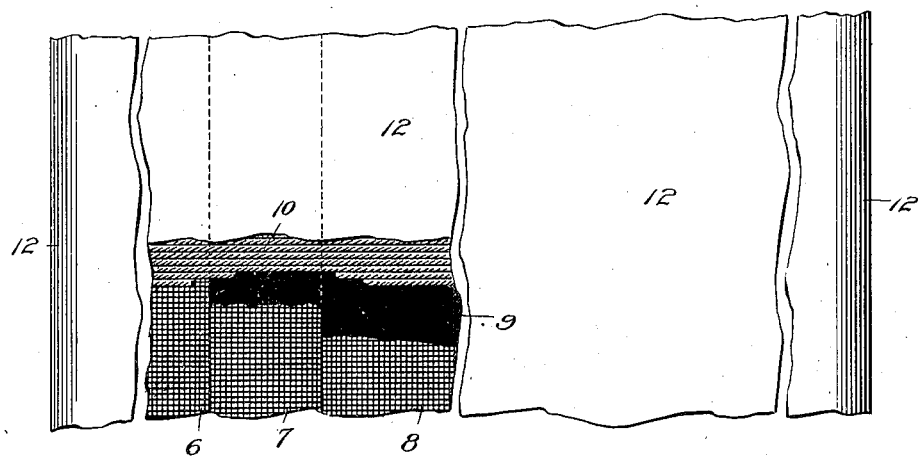
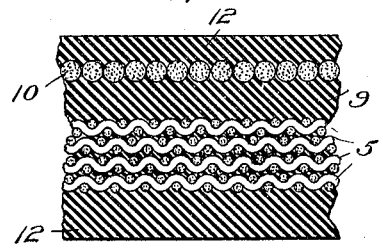
Witness
Edwin L. Bradford
Inventor
L. T. Petersen,
By Wm. O. Dyre
Attorney

UNITED STATES PATENT OFFICE.

LUDVIG T. PETERSEN, OF YOUNGSTOWN, OHIO.

CONVEYER BELT.

1,405,158.  Specification of Letters Patent.  Patented Jan. 31, 1922.

Application filed February 9, 1921. Serial No. 443,702.

*To all whom it may concern:*

Be it known that I, LUDVIG T. PETERSEN, a citizen of the United States, residing at Youngstown, in the county of Mahoning and State of Ohio, have invented certain new and useful Improvements in Conveyer Belts; and I do hereby declare the following to be a full, clear, and exact description of the invention, such as will enable others skilled in the art to which it appertains to make and use the same.

My invention relates to belts of the conveyer type and has for its primary object the production of a belt structure of increased general efficiency as compared with other belts for similar uses at present known to the trade.

By way of further objects and advantages my improved belt is designed, arranged and adapted to insure increased durability and flexibility while in practical operation, and to withstand severe service equally as well as more moderate uses; to insure a more effective and therefore a better bond or union between the carcass or fabric portion of the belt and its cover or working face; to afford superior resistance to the pounding action of material falling upon or forcibly projected upon the moving belt; to provide for fully stretching belts in process of manufacture before same are placed in actual service; to insure permanent and sufficient splicing or joining of belt ends; and to the production of belts of the character indicated peculiarly adapted to flex over guiding pulley and to trough suitably in the performance of their intended functions.

With the foregoing and other objects in view the present belt structure consists essentially of a relatively thick and strong but flexible body or carcass of multiply construction, an elastic cover enclosing said body or carcass having a working face gradually increasing in thickness toward its longitudinal center, and a continuous series of parallel, reinforcing binding cords embedded in the elastic cover of the belt immediately below its working face, and running transversely across the structure.

In practical operation and use conveyer belts are frequently subjected to very severe service in handling such commodities as ore, limestone, coal, coke, metal castings, etc., which are usually delivered with considerable force upon the middle or troughing portion of the moving belt, and at an angle with relation to the direction of its travel. As a consequence the greatest wear and tear is upon said central portion of the working face of the structure, and for this reason, among others, it has long been the practice to form said working faces of an elastic cushioning material such as rubber gradually increased in thickness toward the center; and furthermore to flank said cushioning area upon both sides by inelastic, non-flexible edges, thereby producing belts peculiarly adapted to trough when in service, and to withstand the frictional wear of the pulleys and guide rollers over which it runs, as also the wear and tear due to the friction and impact of materials carried by the belt.

In addition to the aforesaid characteristics and practical advantages the present belt structure contemplates and includes a novel and highly important arrangement of parallel reinforcing binding cords crossing the belt transversely, and embedded beneath the working face thereof as a means of effecting a most secure bond between the belt body and its elastic cover, and also of protecting the structure from undue punishment while in service, thus materially increasing its durability.

With the foregoing objects in view, and others which will be apparent to persons skilled in the art to which this invention relates, the present improvement may be said to include substantially the structural arrangement and combination of component parts hereinafter particularly described and pointed out in the claims following.

In the accompanying drawings which form part of this application for Letters Patent, and whereon like characters refer to corresponding parts in the several views:

Figure 1 is a transverse sectional view broken away at three points for economy of space upon the sheet, and showing the multiply base or carcass of the structure, an elastic casing or cover for same, and one of a series of binding cords embedded in said cover beneath its working face serving in part to bind said body and cover together.

Figure 2 is a fragmentary plan view of the invention broken as in Figure 1 for economy of space, and partly uncovered for the purpose of revealing the underlying structure; while Figure 3 is also a fragmentary view, being a transverse vertical section similar to Figure 1, but upon a relatively enlarged scale.

Reference being had to the drawings and numerals thereon, 5 indicates the body of the structure formed of frictioned fabric such as belt-duck, or other strong, durable, woven, but flexible material preferably impregnated with rubber compound. This body element or carcass of the belt is of multiply construction, the number of plies employed being dependent only upon the size and proportions of the belt, and the character of service which it is intended to perform. In the present instance six plies are shown, the uppermost of which, and the next below being interrupted at both sides in their passage across the belt structure so as to collectively present a step-like appearance or gutter as best shown by Figures 1 and 2 at 6, 7 and 8.

After the belt body or carcass 5 has thus been laid or built up, the steps 6, 7 and 8, are then filled with rubber 9, so compounded as to produce a relatively soft and elastic bed when finally vulcanized. As shown by Figures 1 and 2 this elastic bed portion 9, of greatest thickness at its longitudinal center, is crossed transversely by a continuous series of individual cords 10, of a size best suited to the character of work for which the particular belt is intended, in parallel arrangement as shown by Figure 2, each passing entirely around opposite sides of the belt body 5, and terminating at 11, 11, upon the under surface thereof, thus obtaining a secure anchorage.

Entirely enclosing the structure thus far described is an envelope or outer cover 12 of relatively soft rubber compounded similarly as is the bed portion 9 aforesaid with which it unites during vulcanization so that said cords 10 in parallel arrangement are then practically embedded in said cover, immediately beneath the working face of the belt, where they serve collectively the twofold purpose of resisting the impact of materials forcibly projected upon the belt when in service, and securely binding the belt cover 12 to its body 5 to prevent separations so common in some forms of conveyer belts.

After a belt structure has been assembled substantially as hereinbefore indicated, it will be noted that the stretch naturally inherent in such structures, may be effectively removed before vulcanization, and that during this step in the process of manufacture the transverse cords 10 are merely subjected to a slight separation while the body 5 is stretched to its limit, there being no longitudinal cords of less tensile strength than that of the canvas body to be strained or broken during the stretching operation.

Belts having been thus constructed substantially as hereinbefore set forth are finally completed by the ordinary and well understood process of vulcanization, and it will be particularly noted that finished belts embodying the present invention are practically unstretchable for the reason that the stretch may be and is removed before vulcanization, and this without in the least weakening the structure. Moreover, it will be seen that the cords 10 embedded in the elastic cover immediately below its working surface, pass completely around opposite sides of the belt and thus afford a permanent and secure anchorage or tie between the belt body and its elastic cover to prevent cover separations; also it will be noted that the slight separation or spreading of the cords 10 incident to the stretching process enables the rubber compound to flow freely between said cords during vulcanization, producing in effect a series of transverse ridges thus insuring still better adhesion between the belt cover and body, and affording superior resistance to the pounding action of materials projected upon the working surface of the belt when in service.

The said working surface being underlaid by an elastic body gradually increasing in thickness toward the longitudinal center of the belt, cushions the particles of coke, iron ore, coal or other substances forcibly projected upon the belt, and as stated, the cords 10 materially assist in resisting such thrusts, and protecting the belt body 5 below. At the same time said cords 10 are themselves protected against breakage by reason of the fact that the rubber 9 in which they are embedded permits said cords to spread slightly as occasion may require, whenever the belt may be struck with unusual force by material or materials having roughened or irregular surfaces, particularly protuberances which might serve to sever the unyielding threads of a woven material under like conditions.

The foregoing being a description of the present invention in one complete and satisfactory embodiment, it should be understood that I do not consider myself limited to the particular form and arrangement or proportion of parts shown and described, but on the contrary these may be variously changed and modified without in the least departing from the spirit of my invention or materially reducing its efficiency.

Having thus described my invention what I now claim and desire to secure by Letters Patent is:—

1. In a conveyer belt the combination with a body, of an elastic cover for said body, and a series of individual wear-resisting cords embedded in said cover extending around the sides of the belt body.

2. In a conveyer belt the combination with a body, of an elastic cover for said body, and a series of individual wear-resisting cords embedded transversely in said cover extending around the sides thereof.

3. In a conveyer belt the combination with a body, of an elastic cover for said body of gradually increasing depth toward its longitudinal center, and a series of individual parallel wear-resisting cords embedded transversely in said cover extending around the sides of the belt body.

4. In a conveyer belt the combination with a belt body, having a longitudinal concavity in its upper surface, of an elastic cover for said body filling said concavity, and a series of individual wear-resisting cords embedded in said cover and terminating beneath the belt body.

5. In a conveyer belt the combination with a multiply belt body formed of relatively stiff frictioned fabric having a longitudinal concavity in its upper surface, of an elastic cover for said body filling said concavity, and a series of individual parallel wear-resisting cords embedded transversely in said cover beneath its working surface extending around the sides and beneath the belt body.

6. In a conveyer belt the combination with a body, of an elastic cover for said body, and a series of individual wear-resisting cords embedded in said cover.

In testimony whereof I affix my signature, in presence of two subscribing witnesses.

LUDVIG T. PETERSEN.

Witnesses:
C. T. SAMSON,
WM. E. DYRE.